(12) United States Patent
Erickson et al.

(10) Patent No.: US 9,869,696 B2
(45) Date of Patent: Jan. 16, 2018

(54) METHOD FOR IMAGING A FEATURE USING A SCANNING PROBE MICROSCOPE

(71) Applicant: DCG Systems, Inc., Fremont, CA (US)

(72) Inventors: Andrew Norman Erickson, Santa Barbara, CA (US); Stephen Bradley Ippolito, Saint Petersburg, FL (US); Sean Zumwalt, Oxnard, CA (US)

(73) Assignee: FEI EFA, INC., Freemont, CA (US)

( * ) Notice: Subject to any disclaimer, the term of this patent is extended or adjusted under 35 U.S.C. 154(b) by 0 days.

(21) Appl. No.: 15/015,067

(22) Filed: Feb. 3, 2016

(65) Prior Publication Data

US 2016/0231353 A1    Aug. 11, 2016

Related U.S. Application Data

(60) Provisional application No. 62/111,198, filed on Feb. 3, 2015.

(51) Int. Cl.
G01Q 60/30 (2010.01)
(52) U.S. Cl.
CPC .................. *G01Q 60/30* (2013.01)
(58) Field of Classification Search
CPC ...................................................... G01Q 60/30
See application file for complete search history.

(56) References Cited

U.S. PATENT DOCUMENTS

| | | | | |
|---|---|---|---|---|
| 5,929,643 A * | 7/1999 | Sakai | ................ | B82Y 35/00 324/754.26 |
| 6,185,991 B1 | 2/2001 | Hong et al. | | |
| 6,337,478 B1 * | 1/2002 | Uehara | ................ | B82Y 35/00 250/216 |
| 8,839,461 B2 * | 9/2014 | Fukuma | ................ | B82Y 35/00 250/306 |
| 2005/0269510 A1 | 12/2005 | Chang | | |
| 2008/0292850 A1 * | 11/2008 | Gotsmann | ............ | B82Y 10/00 428/195.1 |

(Continued)

FOREIGN PATENT DOCUMENTS

JP    2001351957 A    12/2001

OTHER PUBLICATIONS

"Atomic-force microscopy", Wikipedia, Retrieved from the Internet Jan. 26, 2016, https://en.wikipedia.org/wiki/Atomic-force_microscopy, 16 pages.

(Continued)

*Primary Examiner* — Wyatt Stoffa
*Assistant Examiner* — Eliza Osenbaugh-Stewart
(74) *Attorney, Agent, or Firm* — Scheinberg & Associates, P.C.; Michael O. Scheinberg

(57) ABSTRACT

Using a local-potential-driving probe drives a conductor to a known potential while adjacent lines are grounded through the sample body reduces electrostatic scanning microscope signal from adjacent lines, allows imaging of metal lines deeper in the sample. Providing different potentials locally on different conductive lines using multiple local-potential-driving probes allows different conductors to be highlighted in the same image, for example, by changing the phase of the signal being applied to the different local-potential-driving probes.

22 Claims, 7 Drawing Sheets

(3 of 7 Drawing Sheet(s) Filed in Color)

(56) References Cited

U.S. PATENT DOCUMENTS

2012/0185173 A1* 7/2012 Yamamoto ......... A61B 5/04001
702/19

OTHER PUBLICATIONS

"Electrostatic force microscope", Wikipedia, Retrieved from the Internet Jan. 26, 2016, https://en.wikipedia.org/wiki/Electrostatic_force_microscope, 2 pages.
E. Tsunemi et al., "Development of dual-probe atomic force microscopy system using optical beam deflection sensors with obliquely incident laser beams," Review of Scientific Instruments, Mar. 10, 2011, vol. 82, 7 pgs.
H. Edwards et al., "Fast, high-resolution atomic force microscopy using a quarts tuning fork as actuator and sensor," J. Appl. Phys., Aug. 1, 1997, vol. 82 (3), 5 pgs.
P. Girard, "Electrostatic Force Microscopy: Principles and Some Applications to Semiconductors," Institute of Physics Publishing—Nanotechnology, Nov. 27, 2001, vol. 12, pp. 485-490.
R. Courtland, "The Status of Moore's Law: It's Complicated," IEEE Spectrum, Oct. 28, 2013, 6 pages.
S. Ippolito et al., "Active Electrostatic Force Microscopy," 2015 IEEE 22nd International Symposium on the Physical and Failure Analysis of Integrated Circuits, Jun. 25-Jul. 2, 2015; pp. 569-571.
S. Ippolito et al., "Emerging Techniques In Atomic Force Microscopy: Diamond Milling and Electrostatic Force Microscopy," Electronic Device Failure Analysis, Aug. 2015, vol. 17, Issue 3, pp. 4-6, 8-10.
Unknown, "Electrostatic Force Microscopy (EFM) High Resolution and High Sensitivity Imaging of Electrostatic Force," Park Systems, Retrieved from the Internet Jan. 26, 2016; http://www.parkafm.com/index.php/park-spm-modes/93-dielectric-piezoelectric/228-electric-force-microscopy-efm, 5 pages.
Vo Thanh Tung, et al., Tuning Fork Scanning Probe Microscopes—Applications for the Nano-Analysis of the Material Surface and Local Physico-Mechanical Properties, Scanning Probe Microscopy—Physical Property Characterization at Nanoscale, Dr. Vijay Nalladega (Ed.), ISBN: 978-953-51-0576-3, InTech, (Apr. 2012), 25 pages.
Y. Martin et al., "High-resolution capacitance measurement and potentiometry by force microscopy," Appl. Phys. Lett., Mar. 28, 1988, vol. 52, No. 13, pp. 1103-1105.
Y. Martin et al., "Atomic Force Microscope—Force Mapping and Profiling on a Sub-100 Å Scale," J. Appl. Phys., May 15, 1987, vol. 61, Issue 10, pp. 4723-4729.
Wang, Zhi-Yong et al., "High-resoltion surface charge image achieved by a multiforce sensor based on a quartz tuning fork in electrostatic force microscope;" Applied Physics Letters; Aug. 12, 2002; pp. 1300-1302; vol. 81, No. 7; AIP Publishing LLC; U.S.
International Search Report and Written Opinion for Int. App. No. PCT/US2016/016411; dated Apr. 28, 2016, pp. 1-13.

* cited by examiner

METHOD FOR IMAGING A FEATURE USING A SCANNING PROBE MICROSCOPE

TECHNICAL FIELD OF THE INVENTION

The invention related to scanning probe microscopy, and in particular, to electrical measurement made using a scanning probe microscope.

BACKGROUND OF THE INVENTION

A scanning probe microscope (SPM) is a type of microscope that forms images of a specimen using a physical probe that scans over the surface of the specimen. The scanned probe may react with the specimen through a variety of physical forces, including mechanical contact forces, van der Waals forces, capillary forces, chemical bonding forces, electrostatic forces, and magnetic forces. SPMs measure different forces to determine different properties of the specimen, and display the sample properties on an image.

Types of SPMs include the scanning tunneling microscope (STM), which measures conducting sample, and the atomic force microscope (AFM), which can measure various properties of non-conductive sample. AFMs are well known and are described, for example, in U.S. Pat. No. 6,185,991 to Hong et al. for "Method and Apparatus for Measuring Mechanical and Electrical Characteristics of a Surface Using Electrostatic Force Modulation Microscopy Which Operates in Contact Mode", which is hereby incorporated by reference. An AFM can operate in a contact mode, a tapping mode, or a non-contact mode.

FIG. 1 shows an AFM 100 that includes a probe tip 102 at the distal end of a cantilever 104. A positioner 106, typically comprising piezoelectric actuators, scans the cantilever 104 with the probe tip 102 across the surface of a sample 108, which may include features, such as a nanoscale structure 110. Cantilever 104 acts like a spring. When cantilever 104 is deflected and released, it oscillates at a resonant frequency.

Forces between the sample 108 and the cantilever 104 with probe tip 102 cause a deflection of cantilever 104. A laser 116 directs a beam of light 118 towards a reflective surface on cantilever 104 near tip 102, and the reflected light 120 is detected by a position sensitive photon detector 122, which produces an electrical output signal corresponding to the position of the tip. The output signal from the detector 122 is processed by a signal processor 124 to determine the deflection of tip 102 over time. The cantilever oscillation, and therefore the signal output from photon detector 122, is essential sinusoidal and characterized by a frequency, amplitude, and phase. The various forces between the probe and the sample will affect these sinusoidal properties. Signal processor 124 may include one or more lock-in amplifiers 126 to extract signals corresponding to specific frequencies from other signals and noise present in the output signal from detector 122. In various applications, the amplitude, frequency, and/or phase of the cantilever vibration are detected and used to determine a local property of the sample.

A controller 130 controls AFM 100 in accordance with instructions input through user interface 132 or in accordance with program instructions stored in computer memory 134. Controller 130 also controls an imaging device 136, such as a computer display screen, to display sample images formed by AFM 100. In some applications, controller 130 uses the tip deflection to provide feedback to positioner 106 to raise or lower the cantilever 104 to maintain a constant distance between the probe tip 102 and the sample surface. By "distance between the probe tip and the sample surface" is meant the distance from the local sample surface below the probe to the rest position of the probe. In other applications, the probe is scanned in a straight line, and so the height of the probe about the sample surface varies as the local surface topography.

A sample voltage source 140 can apply a dc bias voltage, an ac voltage, or a combination of both to sample 108. As used herein, applying a dc bias voltage may include applying a zero voltage, that is, grounding an element. A scanning probe voltage source 142 can apply a dc bias voltage, an ac voltage, or both to tip 102.

When the AFM is being used to measure voltages, the sample 108 is optionally positioned within a guard chuck 144, which secures the sample and partly surrounds it with a conductive material to reduce stray electrical potentials that can affect the electrical measurements. The potential from sample voltage source 140 can be applied to the bulk sample through the guard chuck, or through a conventional chuck. The potential can also be applied to contact pads on the sample.

When an AFM is operated in a mode to detect electrostatic force, it is referred to as an electrostatic force microscope (EFM). The EFM is a type of vibrating, non-contact AFM in which a force generated by applying an electrical potential difference between the probe tip and the sample is measured. An EFM is described, for example, in P. Girard, "Electrostatic Force Microscopy: Principles and Some Applications to Semiconductors," Nanotechnology 12, 485 (2001).

As described in Girard, a voltage difference between a sample and an AFM tip creates a force proportional to the change in capacitance with probe height and the square of the potential difference:

$$F = \frac{1}{2}\frac{dC}{dz}V^2$$

The voltage, V, is a combination of any applied dc voltage ($V_{dc}$), applied sinusoidal voltages ($V_{AC}$), the contact potential ($V_{cp}$), and any externally induced surface voltage ($V_{induced}$).

$$V = (V_{cp} + V_{dc} + V_{induced}) + V_{AC}\sin\Omega t$$

The force can be decomposed into three frequency terms. A dc term:

$$F_{dc} = \frac{1}{2}\frac{dC}{dz}\left[(V_{dc} + V_{cp} + V_{induced})^2 + \frac{1}{2}V_{AC}\right]$$

corresponds to a continuous bend of the cantilever, which is hard to detect.

A frequency Ω term:

$$F_\Omega = \frac{dC}{dz}(V_{dc} + V_{cp} + V_{induced})V_{AC}\sin\Omega t$$

is dependent on the capacitive coupling and the sample voltages $V_{cp}$ and $V_{induced}$ and is therefore useful to show voltage contrast on the sample. In some implementations, a feedback loop maintains $F_\Omega$ at 0 by making $V_{dc}$ equal to $=-(V_{cp}+V_{induced})$, which can improve image quality under some conditions.

A frequency $2\Omega$ term:

$$F_{2\Omega} = \frac{1}{4}\frac{dC}{dz}V_{AC}^2\cos 2\Omega t$$

is dependent on the local capacitive coupling. A lock-in amplifier can be used to extract the $F_\Omega$ or the $F_{2\Omega}$ signal from noise when scanning at a constant tip-sample distance.

EFM is performed by scanning a probe across the sample, while applying one or more potentials to probe and/or to the sample. The applied potentials may be ac, dc, or combinations thereof.

AFM 100 of FIG. 1 shows a potential V1 applied to the probe tip 102 and a potential V2 is applied to the sample 108. While a user may desire to apply voltage V2 to the nanoscale structure 110, various factors affect the electrical properties at nanoscale structure 110, which results in intermediate potentials on nanometer scale structure 110.

The capacitance between the AFM probe tip apex and nearby region of the sample is a significant component of the EFM technique. However, parasitic capacitance from the entire sample to the AFM probe tip cone and cantilever creates additional measured force. Furthermore, in complex samples, like an integrated circuit, the nanometer scale structures at or near the surface may have potentials, which are less clearly defined due to junctions and resistance along multiple paths to the driven substrate body potential. The effect of the parasitic capacitances and the loosely constrained set of potentials creates scanned images with poor signal to noise and unclear sources of the resulting potential map.

FIG. 2 is a vibrating non-contact AFM topography image of a four micrometer by four micrometer area of an integrated circuit at the second metal level above the transistors fabricated by 22 nm process technology. A 22 nm process typically has a metal line spacing of less than 100 nm FIG. 2 shows multiple conductive lines 202 separated by insulating areas 204. In the false color image of FIG. 2, lighter colors indicate a higher elevation of the sample surface. As the magnitude of the oscillation changes with the surface topography during the scan, feedback is used to raise and lower the probe to maintain the oscillation amplitude. The drive voltage to the piezo actuator is plotted to create the topography image.

The image in FIG. 3 is a potential map formed by an EFM of the same area as shown in FIG. 2. The potential map was formed using an AFM probe scanned at a constant height. In the false color image of FIG. 3, regions of higher electrostatic potential are shown as green and regions of lower electrostatic potential are shown in blue. The brighter the color, the higher the electrostatic potential. The imaging probe tip was biased with a time varying frequency near to that cantilever's resonant frequency. FIG. 3 shows some of the metal lines 302 as regions of high electrostatic potential, but their connection paths to each other and the substrate is unclear. The image of the metal lines is unclear because, as described above, there are parasitic capacitances that affect the sensed potential and the electrical potential applied to the sample body through the chuck is modified differently before reaching each of the individual conductive lines due to junctions and different resistances along different paths to the conductors.

As semiconductor circuits get smaller and the metal lines get closer together. The "pitch," or distance between metal lines in modern integrated circuits varies with the fabrication process, but can be typically less than 250 nm, less than 100 nm, less than 80 nm, and even less than 40 nm. As the pitch becomes smaller in each new generation of fabrication processes, it becomes more difficult or impossible to differentiate a single metal line in an EFM image. A method and apparatus is needed to image individual metal lines and sub-surface lines, to show fabrication defects, such as shorts and opens.

Tsunemi et al, "Development of dual-probe atomic force microscopy system using optical beam deflection sensors with obliquely incident laser beams," *Review of Scientific Instruments* 82, 033708 (2011) describes a dual probe AFM system and uses the system to perform a Kelvin Force Measurement to determine the surface potential of a dendritic island of an α-sexithiophene thin film on a highly-doped Si substrate with a 300 nm-thick SiO2 layer. One probe was scanned with the tip-sample distance regulated by an FM (frequency modulation) detection method, while electrical charges were simultaneously injected into the α-sexithiophene thin film by another probe.

SUMMARY OF THE INVENTION

It is an object of the invention to provide improved electrical measurements using a scanning probe microscope.

A scanning probe microscope includes a scanning probe and one or more additional local-potential-driving probes that provide one or more local electrical potentials on a nanometer scale structure on the sample. The local-potential-driving probes may provide a fixed potential, an alternating potential, or a combination of both in order to tailor the local electrical field distribution for maximum sensitivity and selectivity when measurement are performed by the scanning probe. By driving the potential at a local feature rather than through the bulk sample, the local feature can be differentiated on a potential map from neighboring features, which allows for a single line among closely spaced lines to be identified and allows for imaging using fainter signals, such as those from subsurface features. This is particularly useful to identify circuit defects.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the invention provide an AFM that can be used as an EFM and that includes one or more local-potential-driving probes as well as a scanning probe. The technique of driving a local feature to a potential during measurement of electrostatic force is referred to as "active EFM." The local-potential-driving probes are preferably additional AFM probes, similar to the scanning probe. The lateral resolution of an AFM probe, typically less than 500 nm, less than 250 nm, less than 100 nm, or less than 50 nm, allows the local-potential-driving probe to be positioned at or near an element of a local nanostructure, so that the potential at that nanostructure can be driven as desired for the measurement by the scanning probe, for example, the local-potential-driving probe can drive the potential at the nanostructures to ground, to a dc voltage, or with an ac voltage.

Embodiments of the invention provide an imaging tool to detect metal lines by using electric fields generate an image of the features. The local-potential-driving probe defines local boundary conditions on the electrical potential at the nanometer scale. The local-potential-driving probe overcomes the prior art problem in which potentials at local nanostructures are not precisely defined by potentials applied to the bulk sample through the chuck or through contact pads, because of conditions between the remote application of the potential and the local nanostructure. Moreover, the local-potential-driving probe provides a clear difference in visual difference in the AFM image between the driven nanostructure connected to the local-potential-driving probe and adjacent structures that are typically grounded through the sample body or maintained at a different potential through the sample body. This provides sufficient sensitivity to clearly identify individual conductions in an array of adjacent conductors and to image subsurface features that are electrically connected to the driven electrode. For example, if a potential is applied to a surface conductor and an electrical connection exists between the surface conductor and a subsurface conductor, the subsurface conductor will acquire a charge that can be visible in an image formed by the scanning probe. If the circuit design does not include a connection, and then the connection represents a defect. If the circuit design includes a connection between layers, and the image fails to show a charge on the subsurface layer, the circuit includes a defect of a missing connector.

Figure 1:
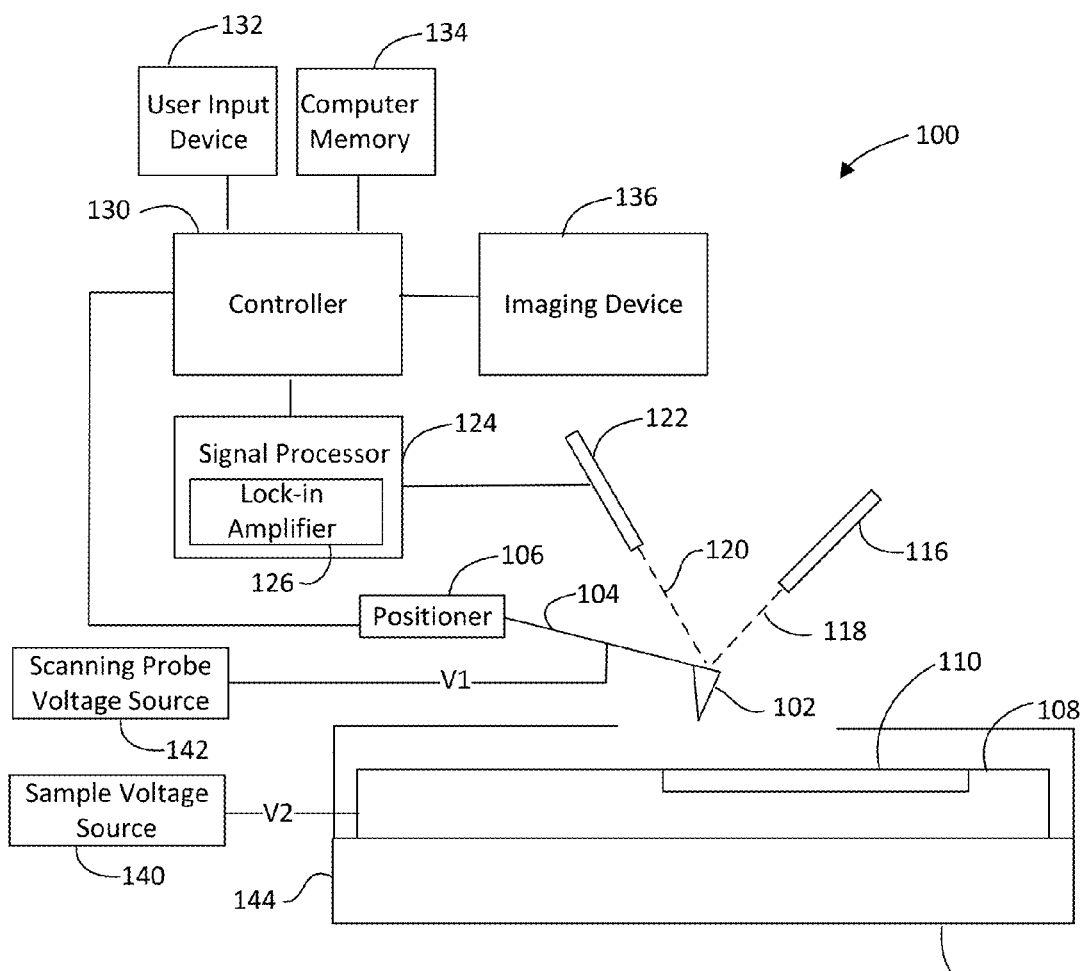
FIG. 1 is a schematic representation of prior art AFM.
Figure 2:
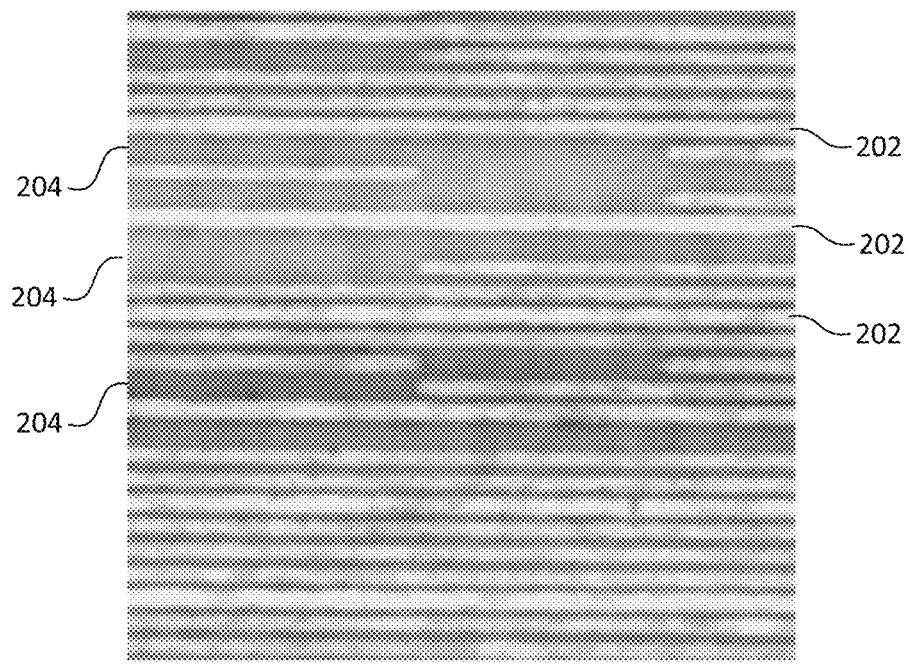
FIG. 2 is vibrating non-contact AFM topography image of a four micrometer by four micrometer area of an integrated circuit at the second metal level above the transistors fabricated by 22 nm process technology.
Figure 4:
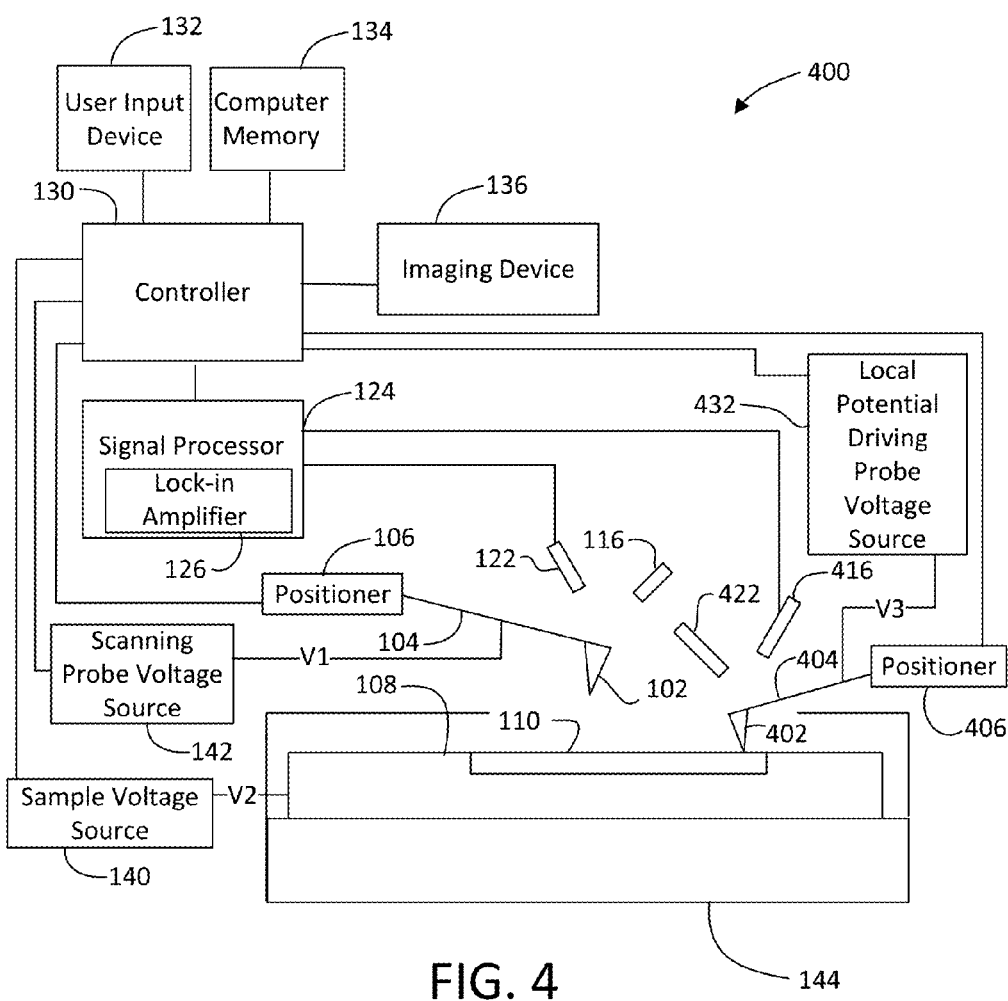
FIG. 4 is a schematic representation of an EFM having a local-potential-driving probe.

FIG. 4 shows an EFM 400 similar to AFM 100 of FIG. 1, but EFM 400 includes a local-potential-driving probe 402 that is used to drive the local potential at nanostructure 110. Elements of EFM 400 that are the same as those in AFM 100 are labelled with the same reference numbers. EFM 400 includes a second AFM sub-assembly that includes a local-potential-driving probe tip 402 on the end of a second cantilever 404, which is positioned with nanometer scale precision by a second positioner 406, which is controlled by controller 130. A laser 422 and a position sensitive photon detector 422 can be used to detect the position of local-potential-driving probe tip 402. A local-potential-driving probe voltage source 432 provides a voltage to local-potential-driving probe tip 402, which then drives the local potential at nanostructure 110 to a desired potential. Local-potential-driving probe voltage source 432 can drive nanostructure 110 to a ground potential, to a non-ground dc potential, or it can provide an ac signal to nanostructure 110. The potential V3 applied to a local-potential-driving probe 402 defines the intermediate potentials on nanometer scale structures 110 in the sample 108 being scanned by probe 102.

Some embodiments provide an AC signal and a DC bias on the local-potential-driving probe 402, ground the sample chuck 144, and apply another DC bias to the imaging probe 102. The AC signal on the local-potential-driving probe is typically at the frequency of the imaging probe's cantilever.

The magnitude of V3 is preferably sufficiently large to make the contacted nanoscale structure appear in the image formed by the imaging probe, and preferably not so great that it will damage the circuit being images. In some embodiments, both an AC signal and a DC bias are applied to the local-potential-driving probe. The DC bias is typically between +/−15 V. The frequency of the AC signal is typically matched to the resonant frequency of the cantilever, which is typically between 1 kHz and 150 kHz. The voltage V1 applied to the imaging probe 102 may include a DC bias of between +/−15V.

Figure 3:
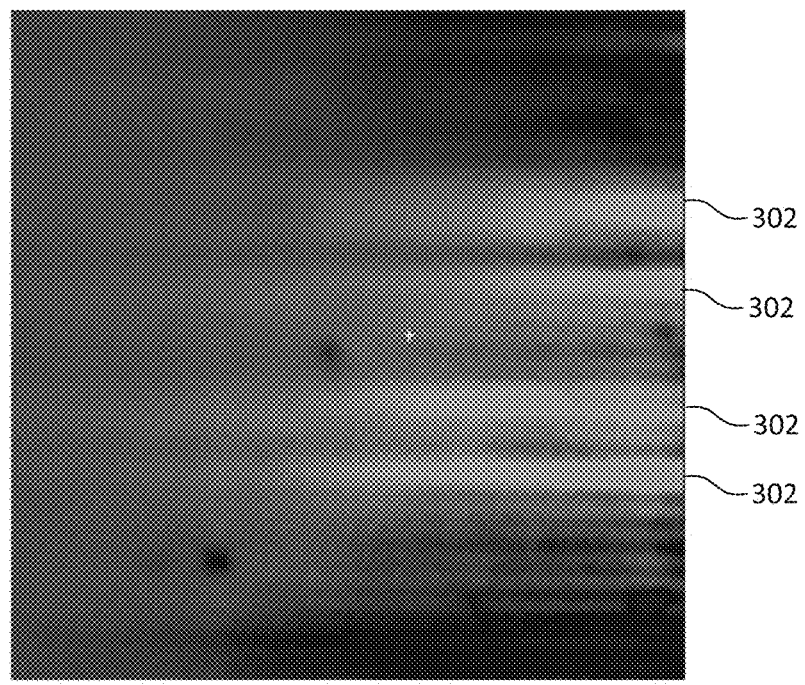
FIG. 3 is an EFM image taken of the same area as FIG. 2 with the AFM probe scanned at a constant height.
Figure 5:
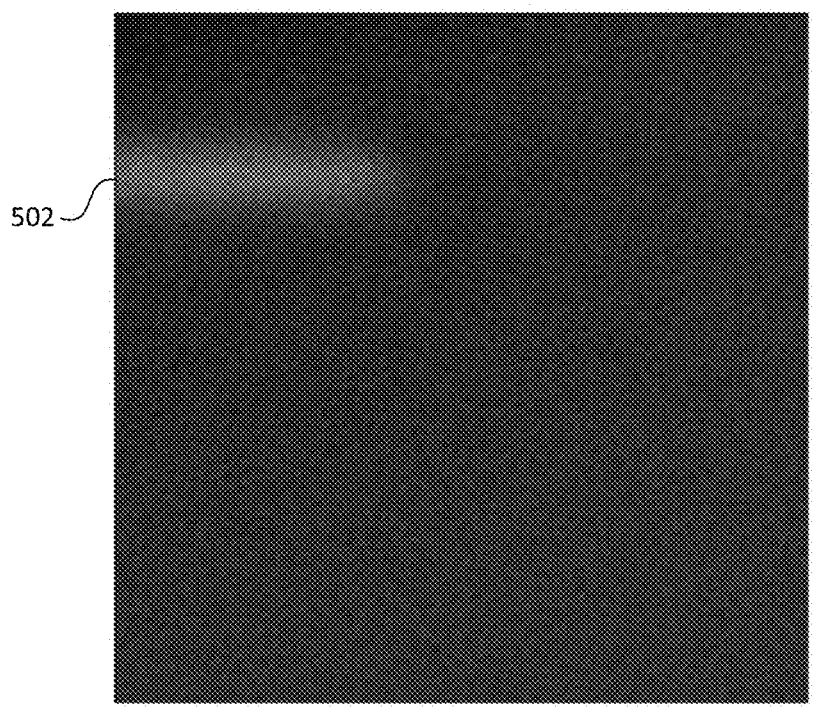
FIG. 5 is an EFM image with the scanning probe maintained at constant height and the local-potential-driving probe in contact with a metal line on the surface, driving its potential.

The image of FIG. 5 was obtained with the probe 102 scanning at constant height and the local-potential-driving probe 402 in contact with a metal line on the surface and driving its potential. The image of FIG. 5 shows the conductor 502 more clearly than the conductors of FIG. 3 are shown. The image of conductor 502 is shown more clearly because of the local application of potential directly onto conductor 502 by the local-potential-driving probe. The potential on conductor 502 is therefore more defined. Also, the lack of potential on neighboring lines, which are insulated from the local-potential-driving probe and which may be grounded through the sample body, makes reduces or eliminated the overlap of the conductive lines shown in the image. The lack of applied potential to neighboring lines also eliminates parasitic capacitance coupling between the neighboring lines and the cantilever or tip cone.

Figure 6:
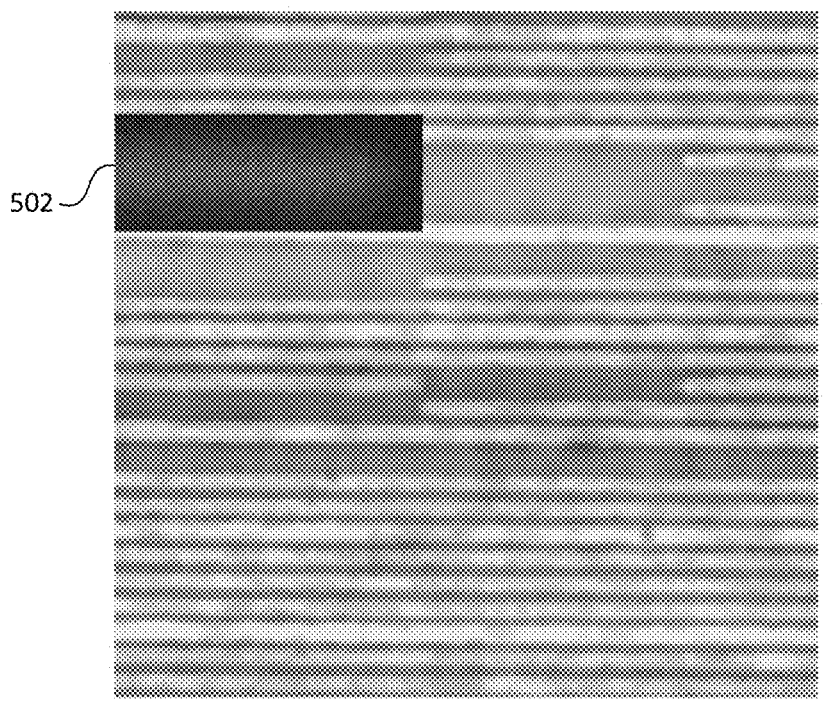
FIG. 6 is an overlay of the EFM signal from FIG. 5 onto the topography image of FIG. 3 to indicate the location of the signal relative to the physical circuit.

FIG. 6 is an overlay of the EFM signal from FIG. 5 onto the topography image of FIG. 3 to indicate the location of the EFM signal relative to the physical circuit. The sample body may be used as a circuit node to guard the potential of the nanometer scale structures that are driven by the local-potential-driving probe or probes. To obtain the image in FIG. 5, the scanned probe tip 102 potential, V1, and sample voltage source 140 potentials, V2, were both held at ground potential, while direct and alternating potential bias V3 was applied to the local-potential-driving probe 402. The alternating potential bias frequency was selected to match the cantilever resonance frequency thereby driving the oscillation of the cantilever. Lock-in amplifier 126 was used for synchronous detection of the cantilever displacement associated with the cantilever oscillation. By driving an alternating potential at or near the resonance of the cantilever, the amplitude or phase of the resonance can be measured by the same mechanism for non-contact mode imaging.

Figure 7:
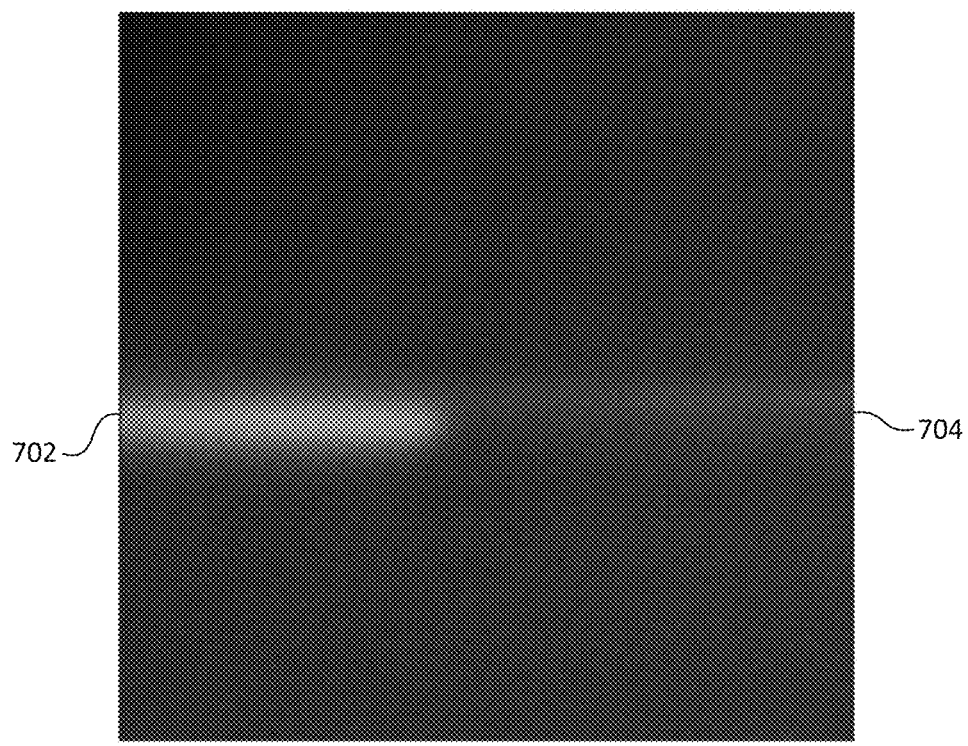
FIG. 7 is an EFM image with the scanning probe scanned at constant height and the local-potential-driving probe in contact with a metal line on the surface, driving its potential as well as the potential of a subsurface metal line via a circuit interconnection.

FIG. 7 shows an image obtained with the scanning probe 102 scanned at constant height and the local-potential-driving probe 402 in contact with metal line 702 on the surface. The local-potential-driving probe 402 drives not only the potential of the surface metal line 702, but also the potential of a subsurface metal line 704 via a circuit interconnection between surface metal line 702 and buried conductor 704. The faint signal extending beyond the end of the strong signal in FIG. 7 indicates that the subsurface metal line 704 is electrically connected to the driven surface line 702. In the image of FIG. 3, a faint line such as line 702 would be washed out by the signals from the other conductors 302. By local-potential-driving probe 402 to locally drive only line 702, the signal from other conductors that are not connected to line 702 is reduced or eliminated, so that the faint signal from subsurface line 704 which is electrically connected to line 702 is detectable, whereas signals are eliminated from other conductors that are insulated from the driven line 702.

Figure 8:
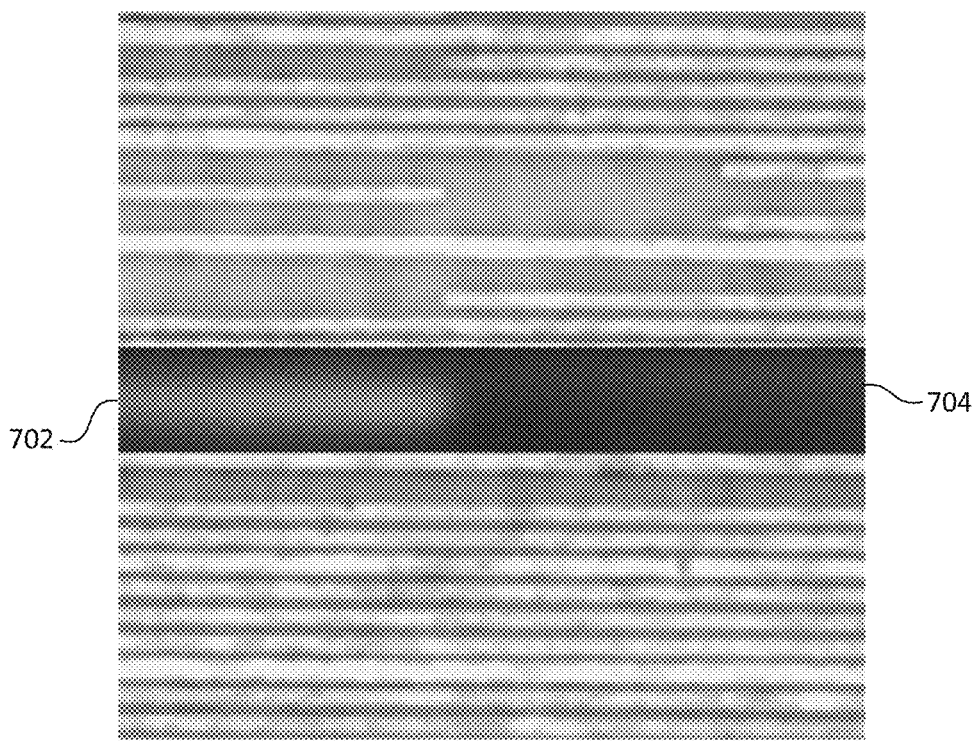
FIG. 8 is an overlay of the EFM signal from FIG. 7 onto the topography image of FIG. 3 to indicate the location of the signal relative to the physical circuit.

FIG. 8 is an overlay of the EFM signal from FIG. 7 onto the topography image of FIG. 3 to indicate the location of the signal relative to the circuit. The techniques described herein are useful for electrical fault isolation by allowing the tracing of paths associated with locally driven potentials. If the circuit design does not call for a connection between driven surface line 702 and subsurface metal line 704, then the presence of subsurface metal line 704 in the image represents a defect. All images in FIGS. 2, 3, and 5-8 were of the same four micron by four micron area of an integrated circuit at the second metal level above the transistors fabricated by 22 nm process technology.

Figure 9:
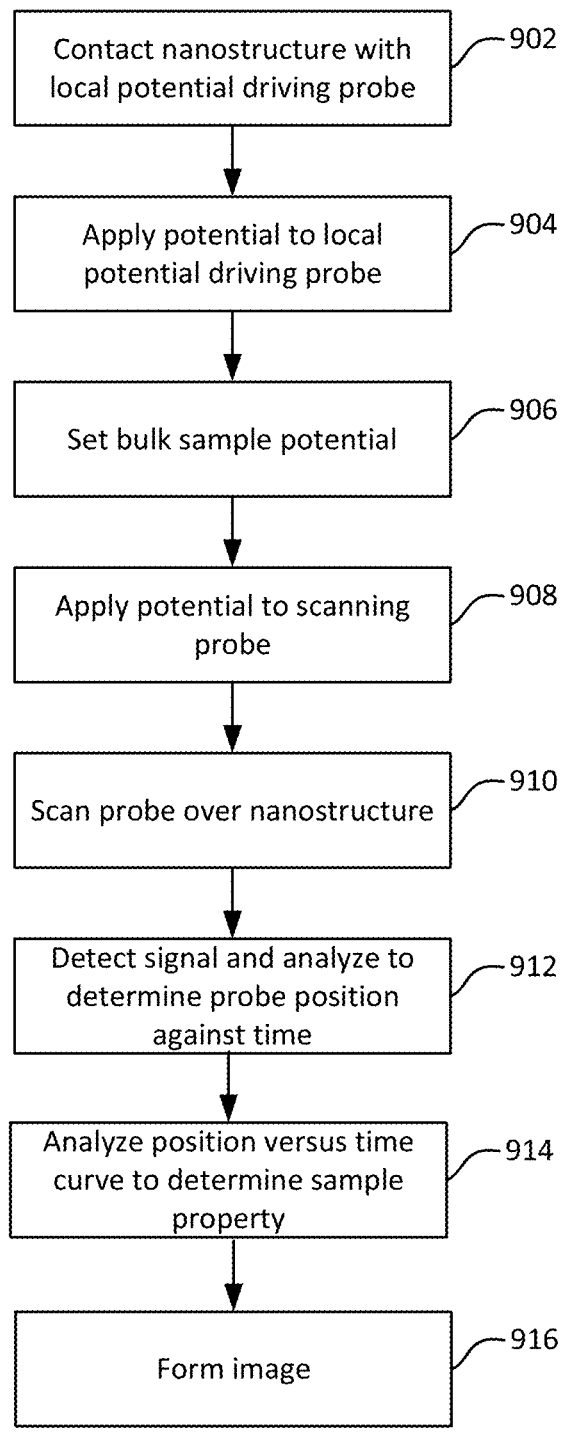
FIG. 9. is a flow chart showing the steps for measuring a local potential using a local-potential-driving probe.

FIG. 9 is a flow chart showing a process for analyzing electrical properties of a nanostructure. The method of FIG. 9 is particularly useful for imaging when the nanostructure is a conductor in a series of closely spaced conductors. By closely spaced is mean spaced less than 500 nm apart, less than 200 nm apart, less than 100 nm apart, less than 50 nm apart, or less than 30 nm apart. In step 902, the nanostructure is contacted by a local-potential-driving probe. In step 904, the local-potential-driving probe drives the nanostructure with a desired potential. In step 906, a potential is applied to the bulk sample. The potential applied to the bulk sample provides a guard potential around conductors adjacent to, but not electrically in contact with, the conductor driven by the local-potential-driving probe. In step 908, a potential is applied to the scanning probe. In step 910, the scanning probe is scanned over an area of the nanostructure. In step 912, the light signal is detected and analyzed to determine the probe positioned over time. In step 914, the probe positioned versus time curve is analyzed to determine one or more sample properties. This analysis may include, for example, using a lock-in amplifier to separate a signal corresponding to a specific frequency. Signal analysis techniques used to determine sample properties from AFM signals are well known, and describe, for example, in Martin, et al., "Atomic Force Microscope-Force Mapping and Profiling on a Sub-100 Å Scale," J. Appl. Phys. 61 (10) (1987). As described above, the frequency analyzed may correspond to the driving frequency $\Omega$ applied between the sample and the probe, or to a multiple of $\Omega$, such as $2\Omega$. When multiple ac signals are applied between the sample and the probe, the frequency analyzed may correspond to the sum or difference of the applied frequencies, or combinations of the sums, differences, and multiples of the applied frequencies. In step 916, the results of the analysis are used to form an image of the nanostructure showing the property, such as electrostatic charge or capacitance. The brightness of each pixel of the image is determined from the analysis at each point of the scan. The color and/or brightness of each pixel of the image is determined from the analysis at each point of the scan. The image can show features that would be drowned out without the use of a local-potential-driving probe, such as subsurface conductors that are electrically connected to the driven conductor. This can show defects, such as inadvertent interlayer connections.

Figure 10:
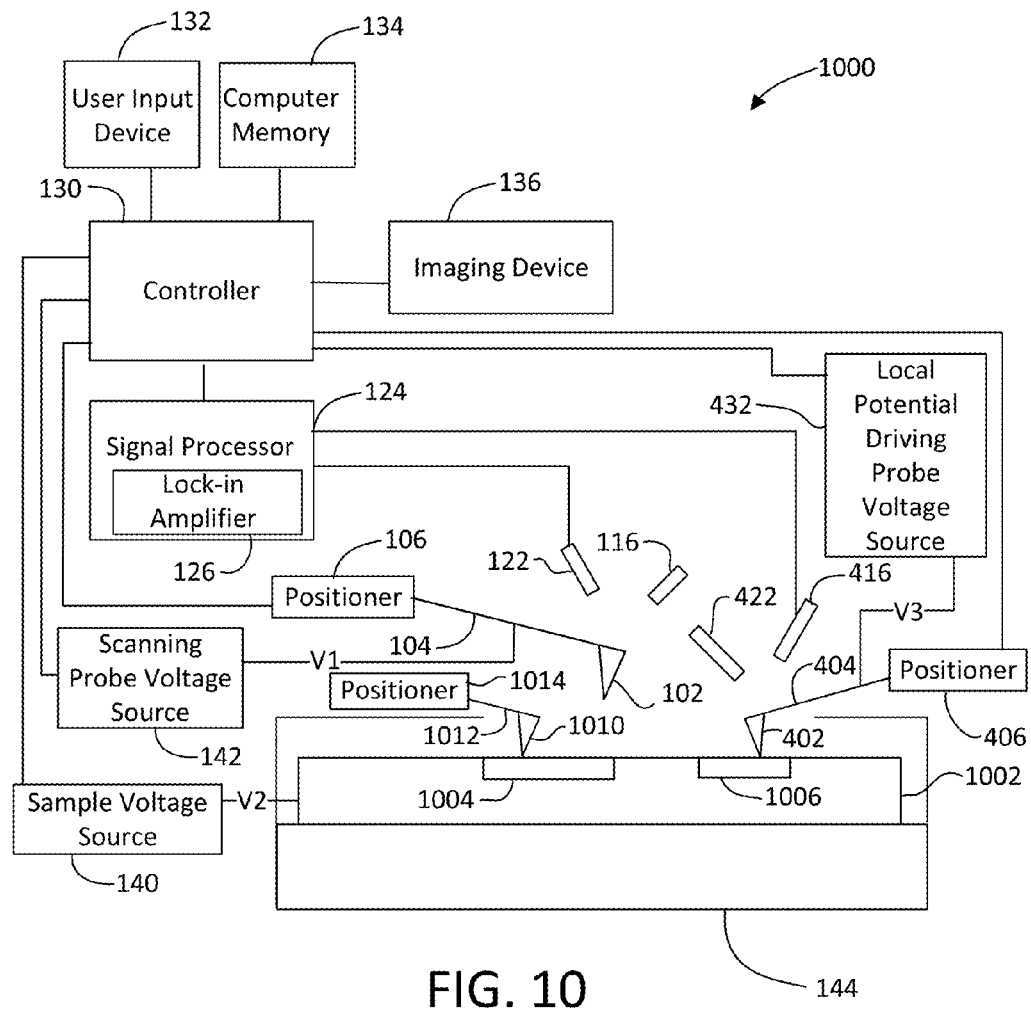
FIG. 10 is a schematic representation of an EFM having more than one local-potential-driving probe.

While one local-potential-driving probe tip 402 is shown in FIG. 4, multiple local-potential-driving probe tips may be employed to create potentials on different nanostructures in the sample. FIG. 10 shows an EFM 1000 examining a sample 1002 having nanostructures 1004 and 1006. In addition to scanning probe 102 and local-potential-driving probe 402, EFM 1000 also includes a third AFM subassembly including a second local-potential-driving probe 1010 at the end of cantilever 1012 positioned by a positioner 1014. For clarity, additional components of the third AFM subsystem are not shown. For example, the laser, photon detector, local-potential-driving probe voltage source, and connections to the controller are not shown.

By using different probing probe tips on different wire lines, it is possible to highlight different conductors in the same image. This can be done, for example, by changing the phase of the signal being applied to one probe tip with respect to the other, and the difference in phase will show up in the EFM image phase data. This can be done with more than 2 probe tips, and only requires the AC bias signal to be phase adjusted on different tips.

The local-potential-driving probe tips may or may not be in contact with the sample, in order to influence the local potential of the nanometer scale structures. In the case of more than two circuit nodes, different direct and alternating bias potentials can be applied to different nanometer scale structures, and the cross coupling of forces between the nodes can be detected separately through frequency mixing or other methods of applying time varying potentials.

Using multiple additional AFM probes to establish defined potentials on multiple nanometer scale structures allows the user to select and suppress image components associated with each of those structures. In particular, for circuit analysis, either the mixing or overlap of two circuit domains can yield the location of a fault or junction. Two frequency cross products can be chosen such that the mixed frequency is at the imaging probe's resonance. In addition to multiple local-potential-driving probes, some embodiments also use multiple scanning probes. Multiple scanning probes with different cantilever resonances can be simultaneously or non-simultaneously scanned. The frequency cross products can be chosen to stimulate the imaging probes to highlight varying interactions such as defect points or junctions. Furthermore, the stimulation frequencies can be chosen to stimulate any of the imaging probe's resonant responses such as higher order nodes or torsional modes.

In EFM measurements in which the sample is biased, the divergence of the field lines from the sample body tend to be one dimensional due to its fairly uniform potential. The resulting field divergence decreases more slowly then a field generated by only the nanostructures or wire lines contacted by the second probe resulting in a larger unfavorable force component from the tip cone and cantilever as opposed to the tip apex. However, the field between two tips, one of which is in contact with a nanometer scale structure, tend to diverge in all three dimensions from the tips, thereby increasing the change in force as a function of displacement. The presence of nanostructures such as devices, domains, or nanoscale wiring are favorably contactable by the present invention and results in negligible contributions tip to tip or nanostructure to the relatively distant cantilever body, overcoming a strong disadvantage of sample biasing. A higher sensitivity is achieved when applying the voltage bias to only the nanostructure devices instead of the entire sample. The sensitivity (deflection of the cantilever) is dominated by the electromagnetic field between the probe apex and the local nanostructure. When the entire sample is biased the electromagnetic field is large in area and acting on not only the tip apex but also the tip cone and the cantilever. This makes the measurement less sensitive to the interaction at the probe apex.

AFM probes are preferably used as the local-potential-driving probe because of the high lateral positioning resolution of the AFM probes and because of their ready availability. The local potential probes can be structurally very similar or identical to the scanning probe. In some embodiment, the scanning probe and the local-potential-driving probe are interchangeable. That is, the system may include two AFM probes, and either probe can be used for either function. The lateral positioning resolution of an AFM probe allows the precise placement of the probe, thereby allowing a potential to be applied at the precise location required on a nanometer scale. The precise vertical position control available on an AFM allows the probe to contact the nanostructure gently to avoid damaging the nanostructure. The deflection of the cantilever can be observed to determine when the local-potential-driving probe has contacted the surface and to control the contact force, preventing damage to the nanostructure while ensuring an adequate electrical contact. When a probe is used only as a local potential probe, its structure can be simplified because it is not necessary to measure oscillation. Thus, the invention is not limited to using an AFM probe as a local-potential-driving probe. Any probe capable of sufficient lateral resolution can be used.

While techniques described may be used to characterize electric fields and surface potentials, a preferred applications of the present invention is to detect and image metal lines, rather than quantitative measurements of electrical properties.

The embodiments described above use a cantilever-type AFM for imaging, the invention is not limited to any type of scanning probe microscope for imaging. For example, embodiments could also use a tuning fork style AFM, as described, for example, in Vo Thanh Tung, et al. "Tuning Fork Scanning Probe Microscopes—Applications for the Nano-Analysis of the Material Surface and Local Physico-Mechanical Properties, Scanning Probe Microscopy-Physical Property Characterization at Nanoscale, Dr. Vijay Nalladega (Ed.), ISBN: 978-953-51-0576-3, InTech, Available from: http://www.intechopen.com/books/scanning-probe-microscopy-physical-property-characterization-atnanoscale/tuning-fork-scanning-probe-microscopes-applications-for-the-nano-analysis-of-the-material-surface By applying the AC signal to the metal lines using the local-potential-driving probes, the techniques described herein increase the signal strength of the EFM signal to allow detection of metal lines deeper in the sample and with less effect from the sample. By grounding the sample and grounding adjacent lines, the techniques further reduces the background noise of the applied AC signal on the metal lines that are being images and by doing so increases the signal-to-noise ratio to achieve better imaging quality.

While the embodiments described above related to measurement of electrostatic forces in an EFM, the invention is applicable to any scanning probe microscopy technique that is affect by the local electrical potential. The techniques to measure sample properties with an imaging probe are well known. See, for example, Girard et al., cited above. Some measurements require only a different signal analysis to determine a different property of the sample. Because the electrical potential on the surface can affect even measurements of non-electrical properties, applications of the invention are not limited to electrical measurement techniques.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The invention has broad applicability and can provide many benefits as described and shown in the examples above. The embodiments will vary greatly depending upon the specific application, and not every embodiment will provide all of the benefits and meet all of the objectives that are achievable by the invention.

The invention includes a microscope system including a controller that can be programmed to carry out the steps described above. It should be recognized that embodiments of the present invention can be implemented via computer hardware, a combination of both hardware and software, or by computer instructions stored in a non-transitory computer-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform, including but not limited to, personal computers, mini-computers, main-frames, workstations, smart phones, networked or distributed computing environments, computer platforms separate, integral to, or in communication with SPMs or other imaging devices, and the like. Aspects of the present invention may be implemented in machine readable code stored on a non-transitory storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The invention described herein includes these and other various types of non-transitory computer-readable storage media when such media contain instructions or programs for implementing the steps described above in conjunction with a microprocessor or other data processor. The invention also includes the computer itself when programmed according to the methods and techniques described herein.

Computer programs can be applied to input data to perform the functions described herein and thereby transform the input data to generate output data. The output information is applied to one or more output devices such as a display monitor. In preferred embodiments of the present invention, the transformed data represents physical and tangible objects, including producing a particular visual depiction of the physical and tangible objects on a display.

Although much of the previous description is directed at mineral samples from drill cuttings, the invention could be used to prepare samples of any suitable material. The terms "work piece," "sample," "substrate," and "specimen" are used interchangeably in this application unless otherwise indicated. Further, whenever the terms "automatic," "automated," or similar terms are used herein, those terms will be understood to include manual initiation of the automatic or automated process or step.

In the following discussion and in the claims, the terms "including" and "comprising" are used in an open-ended fashion, and thus should be interpreted to mean "including, but not limited to . . . " To the extent that any term is not specially defined in this specification, the intent is that the term is to be given its plain and ordinary meaning. The accompanying drawings are intended to aid in understanding the present invention and, unless otherwise indicated, are not drawn to scale.

The various features described herein may be used in any functional combination or sub-combination, and not merely those combinations described in the embodiments herein. As such, this disclosure should be interpreted as providing written description of any such combination or sub-combination.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of forming an image of a nano-scale structure on a sample using an electrostatic force microscope, comprising:

providing a sample electrical potential to the sample body, the sample electrical potential providing a guard potential around the nano-scale structure;

contacting the nano-scale structure on the sample with a first atomic force microscope probe;

providing a local potential to the nano-scale structure through the first atomic force microscope probe;

scanning a second atomic force microscope probe over a region to produce an image of the nano-scale structure.

2. The method of claim 1 in which scanning a second atomic force microscope probe over a region to produce an image of the nano-scale structure includes forming an image of a subsurface conductor that is electrically connected to the nano-scale structure.

3. The method of claim 1 further comprising:

contacting a second nano-scale structure on the sample with a third atomic force microscope probe;

providing a local potential to the second nano-scale structure through the second atomic force microscope probe, the local potential applied to the second nano-scale structure being different from the potential applied to the first nano-scale structure.

4. The method of claim 3 in which providing a local potential to the first nano-scale structure comprises providing an AC potential having a first frequency, providing a local potential to the second nano-scale structure comprises providing an AC potential having a second frequency different from the first frequency.

5. The method of claim 1 in which scanning the imaging probe over a region proximate to the nano-scale structure to produce an output signal includes scanning an imaging probe that is mounted on the end of cantilever scanning an imaging probe that is mounted on a tuning fork sensor.

6. The method of claim 1 further comprising contacting a second surface feature with a second local-potential-driving probe and applying a second potential through the second local-potential-driving probe to the second surface feature.

7. The method of claim 6 in which a first alternating potential of a first frequency is applied between the nano-scale structure and the imaging probe and in which a second alternating potential is applied between the second surface feature and the imaging probe.

8. The method of claim 7 in which the frequency of the first alternating potential and/or the frequency of the second alternating potential are chosen so that cross products of the frequencies are at the imaging probe's resonance frequency.

9. A method of forming an image of a first conductive feature on a sample using a scanning probe microscope, the sample including a sample body and a second conductive feature sufficiently close to the first conductive feature such that an electrostatic force microscope image of the first and second features overlap when an image is formed using a non-contact scanning probe and a potential applied only to the sample body, comprising:

providing a sample electrical potential to the sample body, the sample electrical potential providing a guard potential around the first and second features;

contacting the first feature on the sample with a local-potential-driving probe connected to a positioner capable of positioning the local-potential-driving probe with submicron precision;

providing a local potential to the first conductive feature through the local-potential-driving probe;

scanning an imaging probe of a first scanning probe microscope over a region including the first feature to produce an output signal; and forming an image using a magnitude, frequency, or phase of the output signal of the first feature, the image including only the first feature and features electrically connected to the first feature.

10. The method of claim 9 in which contacting the first feature on the sample with a local-potential-driving probe includes contacting the first conductive feature with an atomic force microscope probe.

11. The method of claim 9 further comprising contacting a third conductive feature on the sample with a second local-potential-driving probe connected to a second positioner capable of positioning the local-potential-driving probe with submicron precision.

12. The method of claim 9 in which determining a magnitude, frequency, or phase of the output signal to form an image comprises forming an image corresponding to the electrostatic charge on the scanned region.

13. The method of claim 12 in which forming an image corresponding to the electrostatic charge on the scanned region includes forming an image corresponding to an electrostatic charge on the first conductive feature and to an electrostatic charge on the second conductive feature.

14. The method of claim 9 in which detecting the magnitude, frequency, or phase of oscillations of the scanning probe form the image includes using a lock-in amplifier to extract a signal from the output signal.

15. A method of observing a subsurface feature of a sample using a scanning probe microscope, the sample including a sample body, a surface feature, and a subsurface feature electrically connected to the surface feature, the method comprising:
   providing a sample electrical potential to the sample body;
   contacting the surface feature on the sample with a local-potential-driving probe connected to a positioner capable of positioning the local-potential-driving probe with submicron precision;
   applying a local potential to the surface feature through the local-potential-driving probe;
   scanning an imaging probe of a first scanning probe microscope over a region proximate to the surface feature to produce an output signal; and
   forming an image using the magnitude, frequency, or phase of the output signal, the image including at least a portion of the surface feature and at least a portion of the subsurface feature, the local-potential-driving probe causing the potential on the surface feature and the sub-surface feature to be sufficient different from the sample potential so that the sub-surface feature is observable in the image.

16. The method of claim 15 in which contacting the surface feature on the sample with the local-potential-driving probe comprises contacting the surface feature with a second scanning probe microscope.

17. The method of claim 15 in which determining a magnitude, frequency, or phase of the output signal to form an image comprises forming an image corresponding to the electrostatic charge on the surface feature and to an electrostatic charge on the subsurface feature.

18. The method of claim 17 in which forming an image corresponding to the electrostatic charge on the scanned region includes forming an image corresponding to an electrostatic charge on the surface feature and to an electrostatic charge on the subsurface feature.

19. The method of claim 15 in which detecting the magnitude, frequency, or phase of oscillations of the scanning probe form the image includes using a lock-in amplifier to extract a signal from the output signal.

20. The method of claim 15 in which:
   providing a sample electrical potential to the sample body includes grounding the sample body;
   providing a local potential to the surface feature through the local-potential-driving probe including grounding the surface feature; and
   scanning the imaging probe includes providing an alternative current potential between the imaging probe and the surface feature.

21. The method of claim 15 in which providing a sample electrical potential to the sample body comprises providing a sample electrical potential to the sample body through a guarded chuck.

22. A microscope system, comprising:
   a chuck for holding a sample;
   a sample electrical potential source for providing an electrical potential to the sample;
   a scanning probe microscope for examining the sample;
   a local-potential-driving probe;
   a local-potential-driving probe potential source for providing an electrical potential to the local-potential-driving probe;
   a computer memory for storing computer instructions for performing the method of claim 1; and
   a controller for controlling the operation of the microscope system to perform the method of claim 1 in accordance with the stored computer instructions.

* * * * *